US007787998B2

(12) United States Patent
Foucart et al.

(10) Patent No.: US 7,787,998 B2
(45) Date of Patent: Aug. 31, 2010

(54) METHOD AND DEVICE FOR ASSISTING THE LATERAL CONTROL OF AN AIRCRAFT RUNNING ON A RUNWAY

(75) Inventors: Vincent Foucart, Ramonville Saint Agne (FR); Eric Albert, Pamiers (FR); Simon Innocent, Toulouse (FR)

(73) Assignee: Airbus France, Toulouse (FR)

( * ) Notice: Subject to any disclaimer, the term of this patent is extended or adjusted under 35 U.S.C. 154(b) by 1188 days.

(21) Appl. No.: 11/392,963

(22) Filed: Mar. 30, 2006

(65) Prior Publication Data

US 2007/0032924 A1 Feb. 8, 2007

(30) Foreign Application Priority Data

Apr. 4, 2005 (FR) .................................. 05 03273

(51) Int. Cl.
*G01C 21/00* (2006.01)

(52) U.S. Cl. ........................................ 701/13; 340/971

(58) Field of Classification Search .................. 701/13; 340/971, 979, 980; 244/184
See application file for complete search history.

(56) References Cited

U.S. PATENT DOCUMENTS 2,732,550 A * 1/1956 Reedy ........................ 342/407
2,892,180 A * 6/1959 Smith ......................... 340/975
4,151,595 A 4/1979 Pressiat
4,197,536 A 4/1980 Levine
5,677,685 A 10/1997 Coirier et al.
5,745,054 A * 4/1998 Wilkens ..................... 340/972
6,178,363 B1 * 1/2001 McIntyre et al. .............. 701/16

FOREIGN PATENT DOCUMENTS

EP 0244091 11/1987

OTHER PUBLICATIONS

Preliminary Search Report dated Dec. 1, 2005.

* cited by examiner

*Primary Examiner*—Dalena Tran
(74) *Attorney, Agent, or Firm*—Dickinson Wright PLLC

(57) ABSTRACT

A method and device for assisting the lateral control of an aircraft running on a runway employ a detector for measuring a lateral deviation of the aircraft relative to a lateral alignment beam transmitted by a radio transmitter installed on the ground, the lateral deviation representing an angular deviation between a straight line passing through the radio transmitter and the detector and the centerline of the runway. A calculator calculates a first distance, defined along the runway, between the position of the pilot in the cockpit and the radio transmitter. A central unit determines, from the lateral deviation and the first distance, a line intended to correspond with the centerline of the runway. A head up display device displays the line on a display screen, superimposed on the environment existing in front of the aircraft and the centerline of the runway.

10 Claims, 6 Drawing Sheets

METHOD AND DEVICE FOR ASSISTING THE LATERAL CONTROL OF AN AIRCRAFT RUNNING ON A RUNWAY

BACKGROUND OF THE INVENTION

The present invention relates to a method and a device for assisting the lateral control of an aircraft, in particular a transport aircraft, running on a runway.

More precisely, the purpose of the invention is to provide the pilot of the aircraft, on takeoff and on landing, with assistance in the lateral control of the aircraft whilst running on the runway, in the form of displays in particular.

Known systems, which are produced for this purpose, generally provide guidance information coming from an automatic guidance system, and sometimes raw data most often corresponding to deviation data with respect to a usual runway alignment beam.

SUMMARY OF THE INVENTION

The purpose of the present invention is to improve such lateral control assistance, in particular in poor visibility. It therefore relates to a particularly effective method of assisting the lateral control of an aircraft running on the ground on a runway.

For this purpose, according to the invention, said method is noteworthy in that:

- there is measured a lateral deviation LOCDEV of the aircraft relative to a lateral alignment beam, which is transmitted by a radio transmitter installed on the ground downstream of the downstream end of said runway, said lateral deviation LOCDEV representing an angular deviation defined in a horizontal plane between, on the one hand, a straight line passing through said radio transmitter and through a detector which is installed on the aircraft and which is able to detect said lateral alignment beam and, on the other hand, the centerline of the runway;
- there is calculated a first distance DLOC which is defined in the horizontal plane, along the runway, between the position of the pilot in the cockpit of the aircraft and said radio transmitter;
- there is determined, at least from said lateral deviation LOCDEV thus measured and from said first distance DLOC thus calculated, a line intended to correspond to the centerline of the runway; and
- this line is displayed on a display screen of a head up display device of the aircraft, superimposed on the environment existing in front of the aircraft, this line being displayed as a true representation such that it is shown superimposed on said centerline of the runway.

Thus, due to the invention there is presented to the pilot, on a display screen of a head up device of the HUD (Head Up Display) type, a line which is shown (in perspective) superimposed on the centerline of the runway. Consequently, even in very poor visibility, the pilot always knows where this centerline is and he can thus pilot the aircraft so that it is centered on this centerline and is therefore in the middle of the runway.

It will be noted that said radio transmitter is a usual runway lateral alignment radio beacon, known by the English term “Localiser” which transmits a lateral alignment beam of the “LOC” type. It is known that such a radio transmitter is a directional microwave frequency radio transmitter which is placed on the centerline of the runway at the end opposite to the approach threshold and which provides guidance in azimuth along the extension of the runway centerline, according to an ideal lateral alignment profile in an instrument approach. In the usual manner, this radio transmitter transmits two signals with different modulations which overlap in the centerline of the runway where the two signals are received at equal intensity.

Advantageously, in order to determine said line, there is determined a first point and a second point, said first point corresponding to the position of said radio transmitter, seen by the pilot and being positioned horizontally according to a lateral deviation value DEVL and vertically according to an elevation value Vsite, said second point illustrating the orientation on the ground of said lateral alignment beam and being placed on a horizon line provided with a heading scale relative to the heading of the aircraft, and said line is displayed on said display screen in such a way as to pass through said first and second points.

It will be noted that the present invention takes account of the fact that, knowing the distance DLOC from the aircraft to the radio transmitter and said lateral deviation LOCDEV (LOC deviation), it is possible to estimate the distance from the aircraft to the centerline of the runway and therefore to display a true representation of this centerline of the runway on the head up display device.

Advantageously, said elevation value Vsite is determined using the following expression:

$$Vsite = \mathrm{arc}\ tg(H/DLOC)$$

in which:

- arctg represents the inverse of the tangent;
- H is a predetermined height between the ground and the eyes of the pilot of the aircraft in the cockpit; and
- DLOC is said first distance.

Furthermore, advantageously, said lateral deviation value DEVL is determined using said measured lateral deviation LOCDEV and said calculated first distance DLOC.

In this case, preferably, said lateral deviation value DEVL is determined using the following expressions:

$$DEVL = LOCDEVc + A1$$

$$LOCDEVc = arctg[tg(LOCDEV) + (\Delta X.\sin B1 + \Delta Y.\cos B1)/DLOC]$$

in which, in addition:

- A1 represents an angular deviation in a horizontal plane between the heading of the aircraft and the orientation of said lateral alignment beam;
- arctg represents the inverse of the tangent tg;
- ΔY and ΔX illustrate predetermined longitudinal and lateral distances respectively between, on the one hand, the position of the pilot in the cockpit of the aircraft and, on the other hand, the position on said aircraft of said detector intended to measure said lateral alignment beam; and
- B1 represents an angle which is determined by the difference between the heading of the aircraft and said lateral deviation LOCDEV.

The preceding expressions make it possible to carry out a correction on the lateral deviation LOCDEV (which is measured by the detector), in order to take account of the fact that the antenna which is used by that detector for measuring that lateral deviation LOCDEV and the eyes of the pilot (who is looking at the display screen) are not in the same place.

In the context to the present invention, it is possible to use different methods for calculating said first distance DLOC between the position of the pilot in the cockpit of the aircraft and said radio transmitter.

During a takeoff phase, in a first preferred embodiment, said first distance DLOC is calculated using the following expression:

$$DLOC=B2+RWYL-TS1-D1(t)$$

in which:

B2 represents the distance between the downstream end of the runway and the position of said radio transmitter transmitting said lateral alignment beam;

RWYL represents the length of the runway;

TS1 represents the distance between the upstream end of the runway and a predetermined position, which corresponds to the position where the pilot is considered to open the throttles during the takeoff phase; and D1(t) corresponds to the integral with respect to time of the ground speed of the aircraft, between the time when the pilot opens the throttles during the takeoff phase and the current time.

Furthermore, in particular when said distance TS1 is not available, in a second embodiment, said first distance DLOC is calculated during a takeoff phase using the latitudes and longitudes of the aircraft and of said radio transmitter.

Preferably, the latitude and longitude of the aircraft are determined from a satellite positioning system of the GPS (Global Positioning System) type for example.

Furthermore, during a landing phase, in a first preferred embodiment, said first distance DLOC is calculated using the following expression:

$$DLOC=B2+RWYL-TS2-D2(t)$$

in which:

B2 represents said distance between the downstream end of the runway and the position of said radio transmitter transmitting said lateral alignment beam;

RWYL represents said length of the runway;

TS2 represents the distance between the upstream end of the runway and a predetermined position, which corresponds to the threshold of the runway; and D2(t) corresponds to the integral with respect to time of the ground speed of the aircraft between the time when the aircraft passes the threshold of the runway and the current time. The time when the aircraft passes the threshold of the runway is determined by the passage of the aircraft at a height of 50 feet (about 15 meters), during the presence of a descent alignment beam.

Furthermore, in a second embodiment, in particular when no descent alignment beam is available, said first distance DLOC is calculated during a landing phase using the latitudes and longitudes of the aircraft and of said radio transmitter.

In a particular embodiment, there is determined and displayed on said display screen in the form of a characteristic sign an assistance point which is such that said line passes through this characteristic sign on said display screen when the aircraft is aligned on the centerline of the runway. The position of said line with respect to said characteristic sign (illustrating said assistance point) therefore makes it possible to inform the pilot which side (right or left) the aircraft is on with respect to the centerline of the runway, when it is not exactly aligned on that centerline.

The present invention also relates to a system for assisting the lateral control of an aircraft running on a runway for the purpose of a takeoff or a landing.

According to the invention, said system is noteworthy in that it comprises:

a detector for measuring a lateral deviation of the aircraft with respect to a lateral alignment beam, which is transmitted by a radio transmitter installed on the ground downstream of the downstream end of said runway, said lateral deviation representing an angular deviation defined in a horizontal plane between, on the one hand, a straight line passing through said radio transmitter and said detector and, on the other hand, the centerline of said runway;

a calculating means for calculating a first distance which is defined in the horizontal plane, along said runway, between the position of the pilot in the cockpit of the aircraft and said radio transmitter;

a central unit for determining, at least from said measured lateral deviation and said first calculated distance, a line intended to correspond with the centerline of the runway; and a head up display device for displaying that line on a display screen, superimposed on the environment existing in front of the aircraft, this line being displayed according to a true representation in such a way as to be shown superimposed on said centerline of the runway.

BRIEF DESCRIPTION OF THE DRAWINGS

The figures of the appended drawing will give a good understanding of how the invention may be embodied. In these figures, identical references denote similar elements.

DESCRIPTION OF THE PREFERRED EMBODIMENTS

Figure 1:
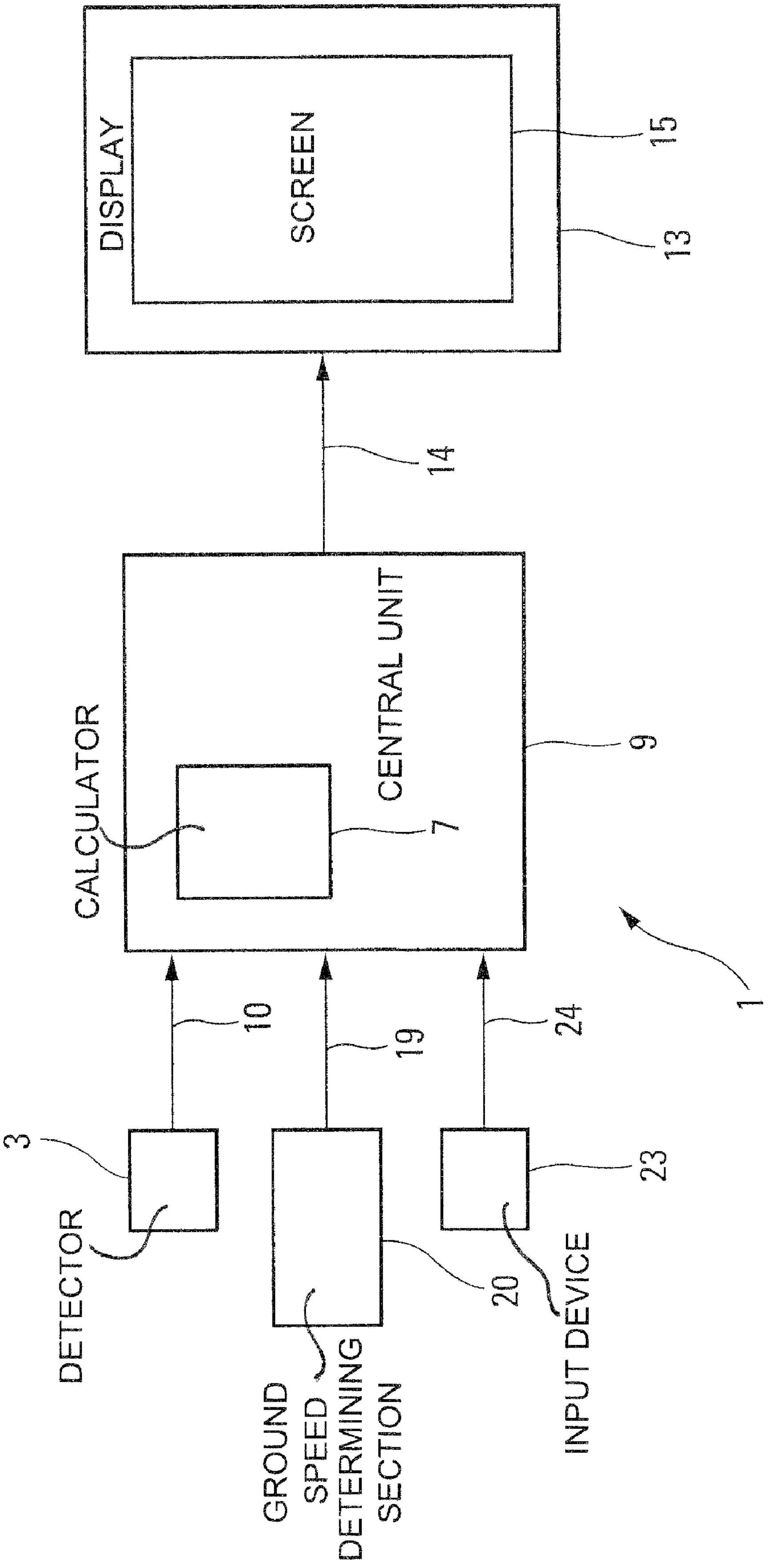
FIG. 1 is the block diagram of an assistance system according to the invention.

The system 1 according to the invention and shown diagrammatically in FIG. 1 is intended to assist a pilot of an aircraft A in the lateral control of said aircraft A whilst running on the ground on a runway 2, in particular during a landing phase or during a takeoff phase of said aircraft A.

Figure 3:
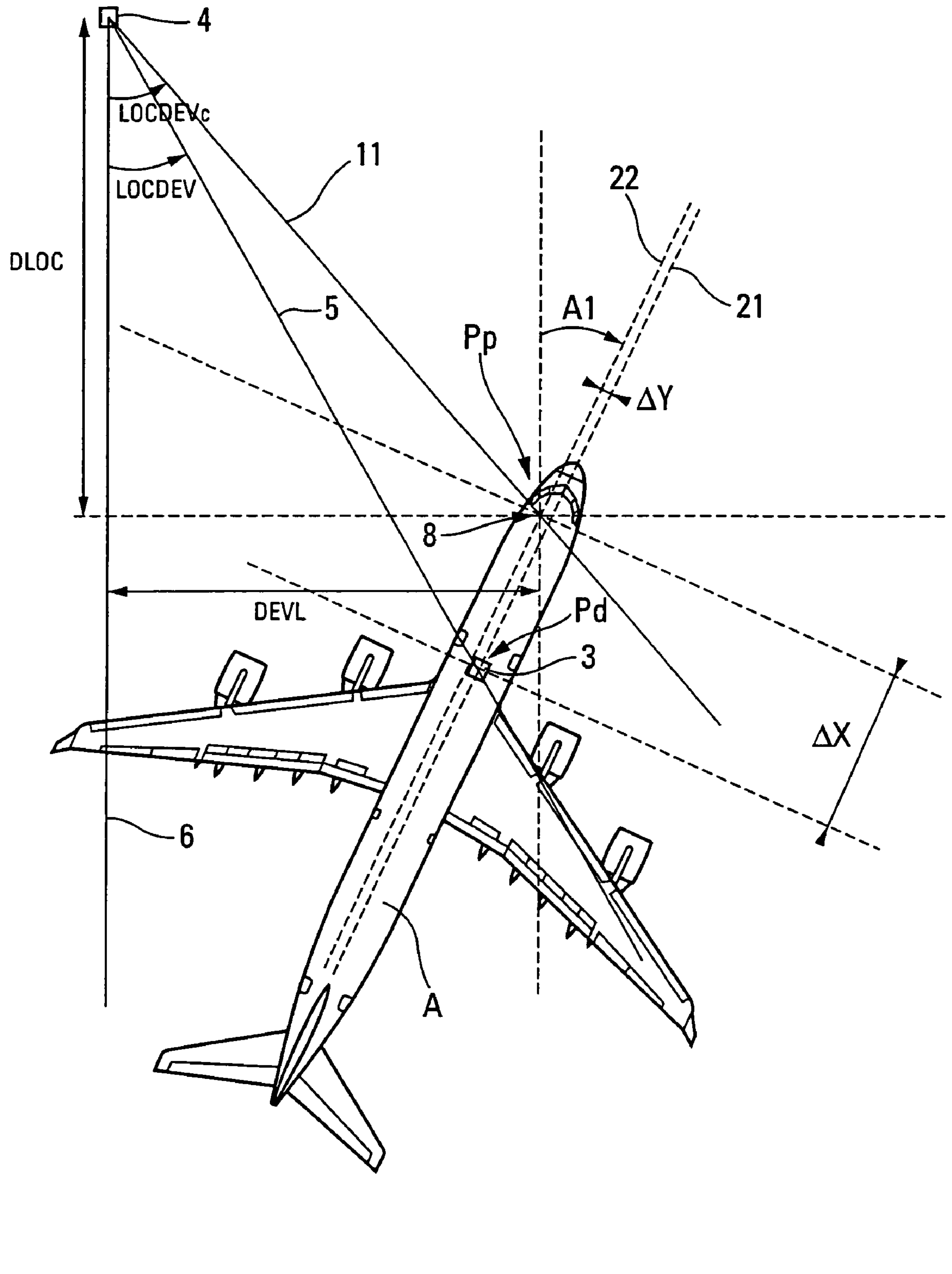

According to the invention, said system 1 which is installed on board comprises:

a usual detector 3 which is installed on the aircraft A, as represented diagrammatically in FIG. 3, and which measures a lateral deviation LOCDEV of the aircraft A with respect to a usual lateral alignment beam which is transmitted by a radio transmitter 4 installed on the ground downstream of the downstream end 2A of said runway 2. Said lateral deviation LOCDEV represents an angular deviation defined in a horizontal plane (shown in FIG. 3) between, on the one hand, a straight line 5 passing through said radio transmitter 4 and said detector 3 and, on the other hand, the centerline 6 of said runway 2;

a calculating means 7 for calculating a distance DLOC which is defined in the horizontal plane, along said runway 2, between the position Pp of the pilot in the cockpit 8 of the aircraft A and said radio transmitter 4, as also shown in FIG. 3;

a central unit 9 for determining, at least from said lateral deviation LOCDEV measured by said detector 3 (and received by a link 10) and said distance DLOC calculated by said calculating means 7, a line 12 intended to correspond with the centerline 6 of the runway 2, as defined hereafter; and a head up display device 13 of the HUD (Head Up Display) type, which is connected by a link 14 to said central unit 9 and which displays that line 12 on a head up display screen 15, superimposed on the environment existing in front of the aircraft A. This line 12 is displayed as a true representation in such a way as to be shown to the pilot directly superimposed on said centerline 6 of the runway 2 when the pilot looks at said display screen 15.

Figure 4:
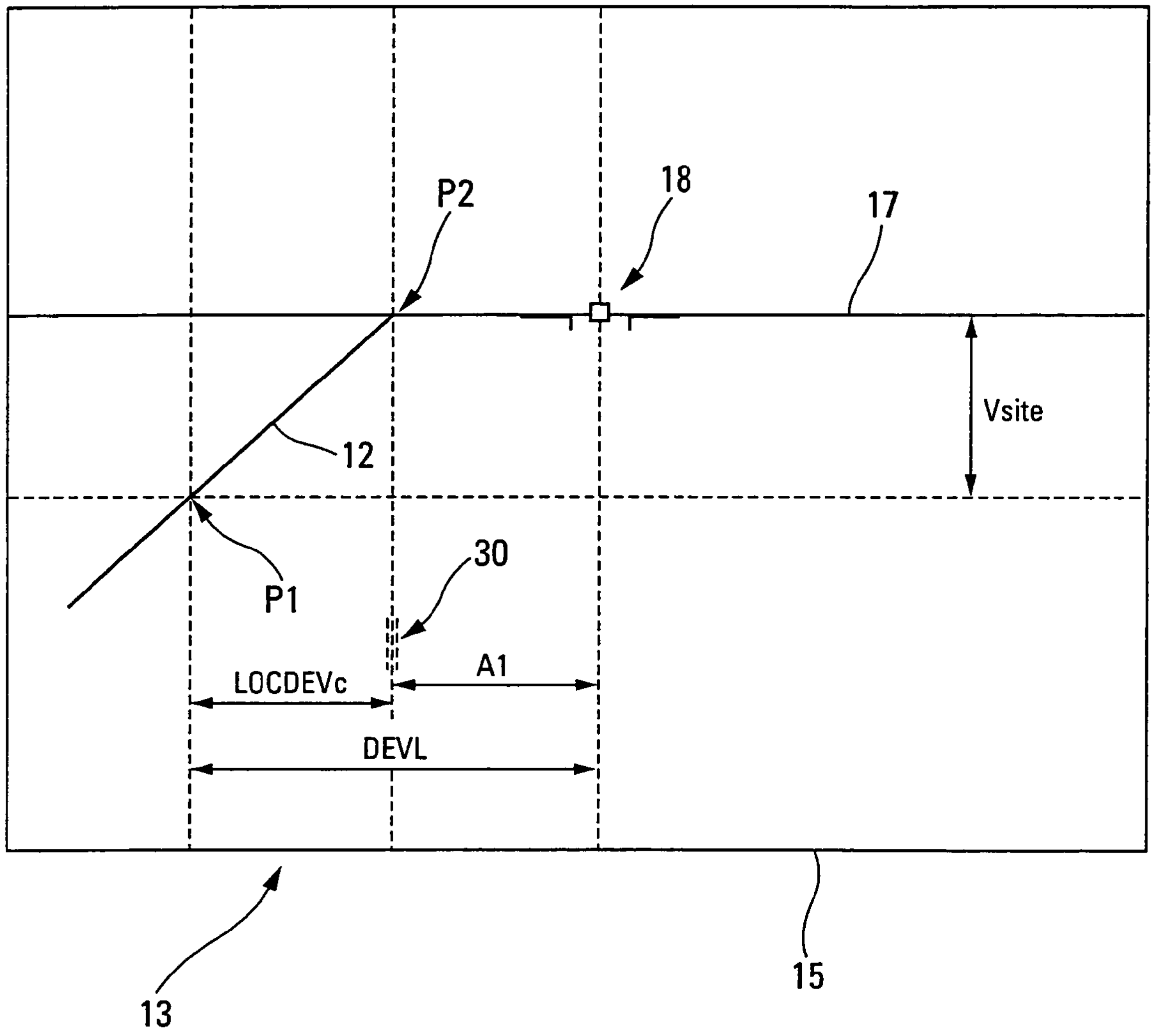

Thus, the assistance system 1 according to the present invention displays to the pilot on the display screen 15 of a head up device 13, a line 12 which is shown in perspective and superimposed on the centerline 6 of the runway 2, as shown in FIG. 4. Consequently, even in very poor visibility, the pilot of the aircraft A always knows where said centerline 6 is and he can thus pilot the aircraft A so that it is always centered on this centerline 6 and is therefore always in the middle of the runway 2 or check, if necessary, the performance of an automatic lateral guidance system.

Said system 1 therefore provides the pilot with effective assistance in the lateral control of the aircraft A, throughout the phase of running on a runway 2 with which a radio transmitter 4 is associated.

Said radio transmitter 4 is a usual runway lateral alignment radio beacon, known by the English term "localizer", which transmits a lateral alignment beam of the "LOC" type. More precisely, said radio transmitter 4 is a directional microwave frequency radio transmitter which is placed on the centerline 6 of the runway 2 at the end 2A opposite to the approach threshold (FIG. 5) and which provides guidance in azimuth along the extension of the centerline 6 of the runway 2, according to an ideal lateral alignment profile in an instrument approach, using a system of the ILS (Instrument Landing System) type. In the usual manner, this radio transmitter 4 transmits two signals with different modulations, which overlap in the centerline 6 of the runway 2 where the two signals are received at equal intensity.

Moreover, said detector 3 is a usual detector of such a lateral alignment beam.

In order to determine said line 12, the central unit 9:

determines an elevation value Vsite and a lateral deviation value DEVL between said radio transmitter 4 and the position Pp of the pilot in the cockpit 8 of the aircraft A, since the line 12 must be seen by the pilot looking at the display screen 15 from this position Pp; and determines on said display screen 15, as shown in FIG. 4:

a point P2 which represents the orientation on the ground of the lateral alignment beam and which is placed on a horizon line 17 provided with a heading scale 26, relative to the heading 18 of the aircraft A; and a point P1 which is positioned horizontally according to a lateral deviation value DEVL and vertically according to an elevation value Vsite.

The display device 13 displays said line 12 on the display screen 15 in such as way that it passes through said point P1 and through said point P2.

Figure 2:
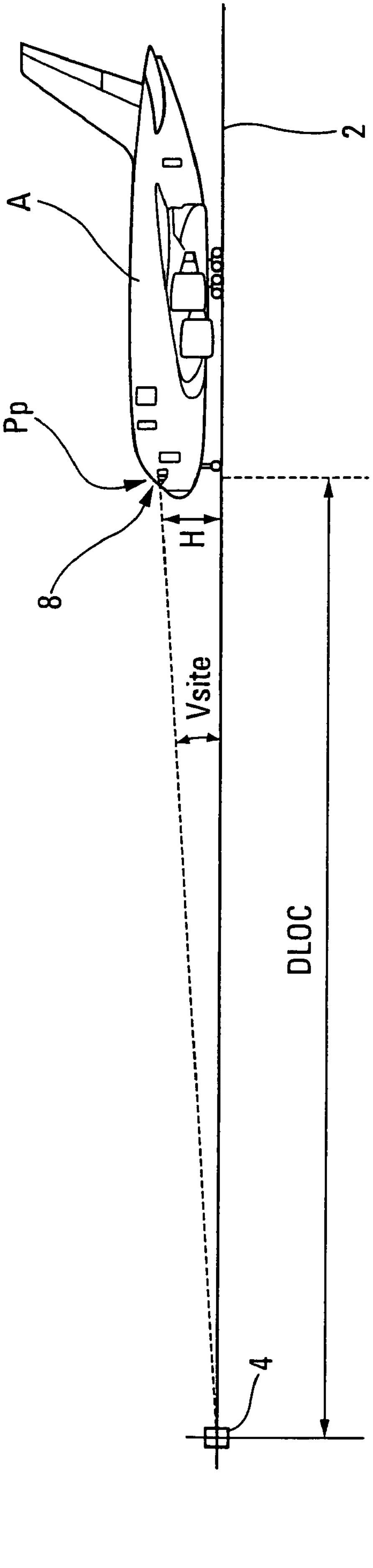
FIGS. 2 to 4 are illustrations making it possible to explain the method of calculating a true displayed line.

Said central unit 9 determines said elevation value Vsite from the following expression:

$$Vsite = \text{arc } tg(H/DLOC)$$

in which:

arctg represents the inverse of the tangent;

H is a predetermined height between the ground (runway 2) and the eyes of the pilot of the aircraft A in the cockpit 8, as shown in FIG. 2; and DLOC is said distance calculated by said calculating means 7.

Furthermore, said central unit 9 determines said lateral deviation value DEVL using said lateral deviation LOCDEV measured by the detector 3 and said distance DLOC calculated by the calculating means 7.

More precisely, said central unit 9 determines said lateral deviation value DEVL using the following expressions:

$$DEVL = LOCDEVc + A1$$

$$LOCDEVc = \text{arc } tg[tg(LOCDEV) + (\Delta X.\sin B1 + \Delta Y.\cos B1)/DLOC]$$

in which, in addition:

A1 represents an angular deviation in a horizontal plane between the heading of the aircraft A and the orientation of said lateral alignment beam;

ΔX and ΔY illustrate predetermined longitudinal and lateral distances respectively (relative to the aircraft A) between, on the one hand, the position Pp of the pilot in the cockpit 8 of the aircraft A and, on the other hand, the position Pd on said aircraft A of said detector 3 (more precisely of its antenna) intended to measure said lateral alignment beam, as illustrated in FIG. 3; and B1 represents an angle which is determined by the difference between the heading of the aircraft A and the lateral deviation LOCDEV.

The preceding expressions make it possible to carry out a correction of the lateral deviation LOCDEV (which is measured by the detector 3) in order to take account of the fact that the antenna which is used by that detector 3 for measuring that lateral deviation LOCDEV is located in particular on a parallel line 21 (with respect to the longitudinal axis of the aircraft A) which is different from the parallel line 22 passing through the eyes of the pilot (who is in said cockpit Pp).

In other words, the straight line 11 passing through the radio transmitter 4 and the position Pp exhibits an angle LOCDEVc which is different from said measured angular deviation LOCDEV.

Furthermore, said calculating means 7 whose purpose is to calculate said distance DLOC can be independent of the central unit 9, or can be integrated with the latter, as shown in the example of FIG. 1.

The methods of calculation used by this calculating means 7 vary according to the phase (takeoff or landing) in question, and thus according to the available data.

Figure 5:
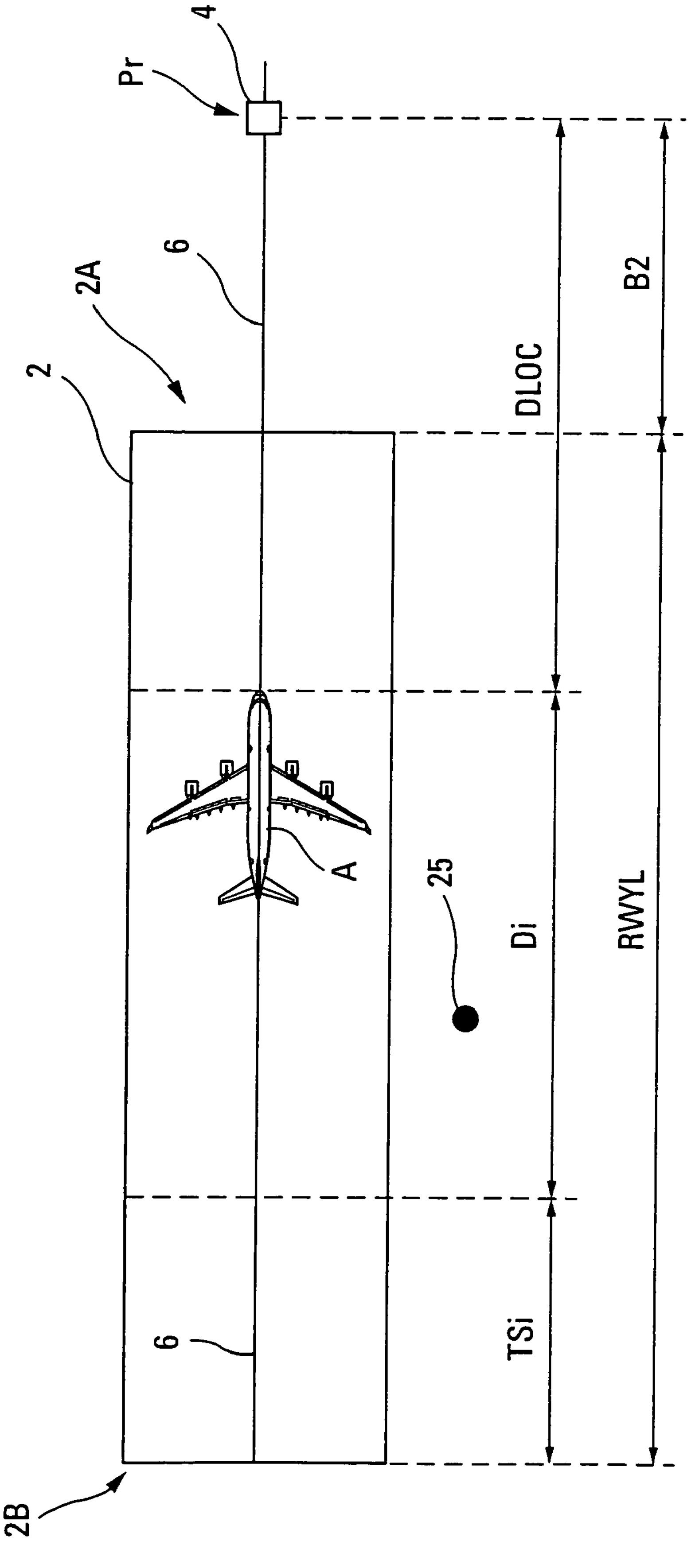
FIG. 5 is an illustration making it possible to explain the method of calculating a particular distance.

However, preferably, said calculating means 7 uses an expression of the following general type for calculating the current distance DLOC:

$$DLOC = B2 + RWYL - Tsi - Di$$

in which:

B2 represents the distance between the downstream end 2A of the runway 2 and the position Pr of said radio transmitter 4 transmitting said lateral alignment beam, as shown in FIG. 5;

RWYL represents the length of the runway 2;

TSi represents the distance between the upstream end 2B of the runway 2 and a predetermined position; and Di represents the distance between this predetermined position and the current position of the aircraft A (more precisely of the cockpit 8) on the runway 2.

During a takeoff phase, in a first preferred embodiment, said calculating means 7 calculates the distance DLOC using the following expression:

$$DLOC=B2+RWYL-TS1-D1(t)$$

in which:

TS1 represents the distance between the upstream end 2B of the runway 2 and a predetermined position, which corresponds to the position where the pilot is considered to open the throttles during the takeoff phase. This value TS1 known by the English expression "takeoff shift" can be entered by the pilot into the system 1 using a usual input means 23 (keyboard, keys, etc.) which is connected by a link 24 to the central unit 9; and D1 (t) corresponds to the integral with respect to time of the ground speed of the aircraft A, between the time when the pilot opens the throttles during the takeoff phase and the current time (for which said distance DLOC is calculated). This ground speed is determined, in the usual way, by a means that is part of the assembly 20.

Moreover, in a second embodiment, in particular when said distance TS1 is not available, said calculating means 7 calculates said distance DLOC during a takeoff phase using latitudes and longitudes of the aircraft A and of said radio transmitter 4 transmitting the lateral alignment beam.

Furthermore, during a landing phase, in a first preferred embodiment, said calculating means 7 calculates said distance DLOC using the following expression:

$$DLOC=B2+RWYL-TS2-D2(t)$$

in which:

TS2 represents the distance between the upstream end 2B of the runway 2 and a predetermined position, which corresponds to the threshold of the runway 2; and D2(t) corresponds to the integral with respect to time of the ground speed of the aircraft A between the time when the aircraft A passes the threshold of the runway 2 and the current time.

The time when the aircraft A passes the threshold of the runway 2 is determined by the passage of the aircraft A at a height of 50 feet (about 15 meters), during the presence of a descent alignment beam.

It is known that such a descent alignment beam, or glide path beam, is an inclined beam, transmitted by a radio beacon 25, in an instrument landing system allowing the guidance of the aircraft A in descent. This descent alignment beam can be measured by an appropriate detector which is fitted on the aircraft A and in particular by the detector 3 if it is designed for such detection. An instrument landing system of the ILS (Instrument Landing System) type is a radio-navigation system composed of automatic beacons 4, 25 situated on the border of the runway 2 and a specialized radio detector 3 fitted on board the aircraft A, which provides horizontal and vertical guidance before and during the landing by presenting to the pilot the lateral deviation with respect to the centerline 6 of the runway 2 and the vertical deviation with respect to a descent plan.

Moreover, in a second embodiment, in particular when no descent alignment beam is available, said calculating means 7 calculates said distance DLOC during a landing phase also using the latitudes and longitudes of the aircraft A and of said radio transmitter transmitting the lateral alignment beam.

Figure 6:
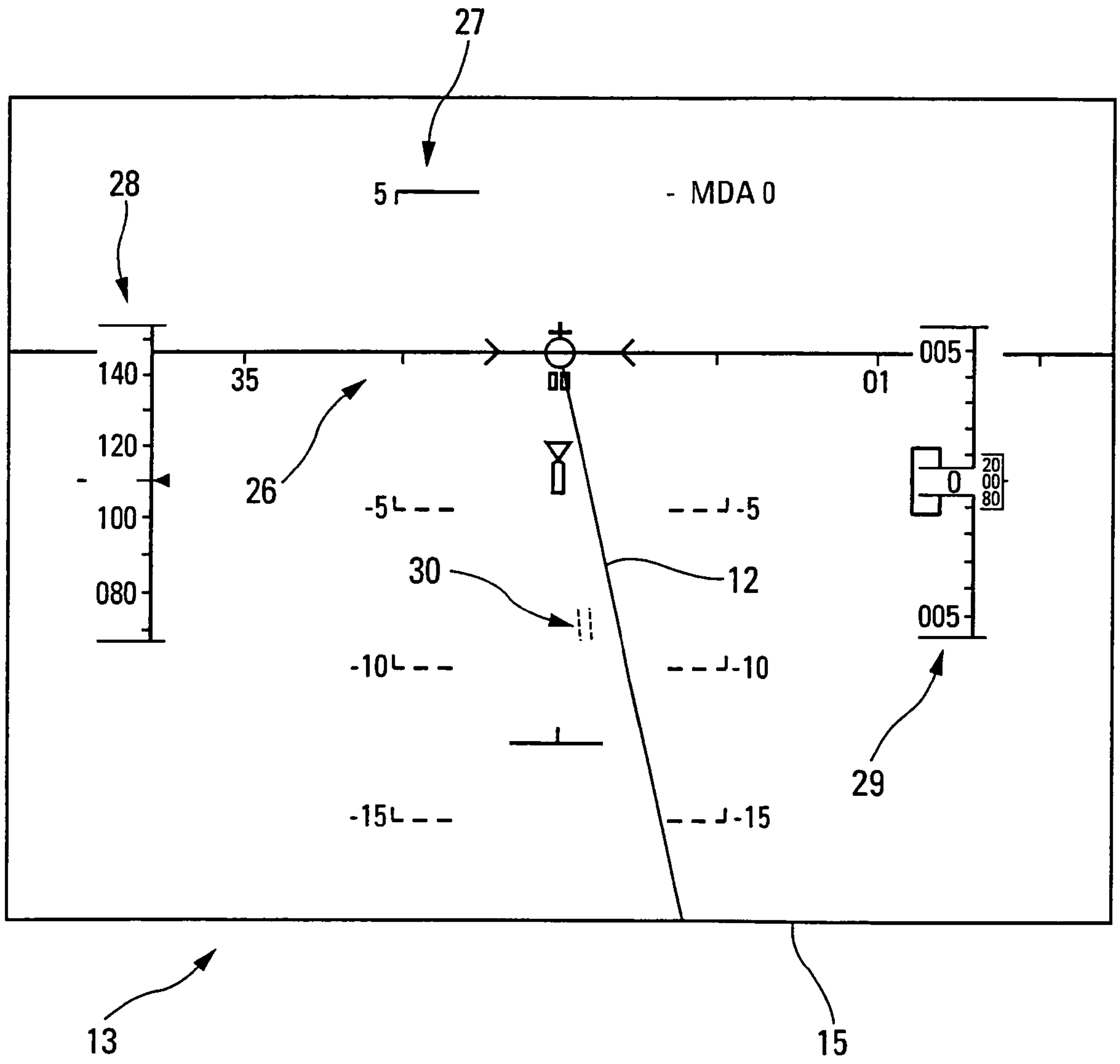
FIG. 6 is a diagrammatic representation of a display screen showing, in particular, the information displayed according to the present invention.

The display device 13 can display the line 12 at the same time as the usual display data, in particular a heading scale 26, a slope scale 27, a speed scale 28 and an altitude scale 29, as shown in FIG. 6.

Moreover, in a particular embodiment, the central unit 9 determines an assistance point and the display device 13 displays this assistance point on said display screen 15 in the form of a characteristic sign 30 (shown in FIGS. 4 and 6). Said assistance point is such that said line 12 passes through said characteristic sign 30 on said display screen 15, when the aircraft A is aligned on the centerline 6 of the runway 2. The position of said line 12 with respect to said characteristic sign 30 (therefore illustrating said assistance point) thus makes it possible to inform the pilot, if necessary, which side (right or left) the aircraft A is on with respect to the centerline 6 of the runway 2.

The invention claimed is:

1. A method for assisting lateral control of an aircraft running on ground on a runway, the method comprising:

measuring a lateral deviation of the aircraft relative to a lateral alignment beam, which is transmitted by a radio transmitter installed on the ground downstream of a downstream end of said runway, said lateral deviation representing an angular deviation defined in a horizontal plane between, on the one hand, a straight line passing through said radio transmitter and through a detector which is installed on the aircraft and which is able to detect said lateral alignment beam and, on the other hand, a centerline of the runway;

calculating a first distance which is defined in the horizontal plane, along the runway, between a position of the pilot in a cockpit of the aircraft and said radio transmitter;

determining, at least from said lateral deviation thus measured and from said first distance thus calculated, a line intended to correspond to the centerline of the runway;

displaying this line on a display screen of a head up display device of the aircraft, superimposed on an environment existing in front of the aircraft, this line being displayed as a true representation such that it is shown superimposed on said centerline of the runway, wherein:

in order to determine said line, there is determined a first point and a second point, said first point corresponding to a position of said radio transmitter, seen by the pilot of the aircraft and being positioned horizontally according to a lateral deviation value and vertically according to an elevation value, said second point illustrating an orientation on the ground of said lateral alignment beam and being placed on a horizon line provided with a heading scale relative to a heading of the aircraft, and wherein said line is displayed on said display screen in such a way as to pass through said first and second points, said lateral deviation value, which is expressed in an equation below as DEVL, is determined using said measured lateral deviation, which is expressed in equations below as LOCDEV, and said calculated first distance, which is expressed in an equation below as DLOC, and said lateral deviation value, DEVL, is determined using following expressions:

$$DEVL=LOCDEVc+A1, \text{ and}$$

$$LOCDEVc=\text{arctg}[tg(LOCDEV)+(\Delta X.\sin B1+\Delta Y.\cos B1)/DLOC],$$

in which, in addition:

A1 represents an angular deviation in a horizontal plane between the heading of the aircraft and the orientation of said lateral alignment beam;

arctg represents an inverse of a tangent tg;

ΔY and ΔX illustrate predetermined longitudinal and lateral distances respectively between, on the one hand, the position of the pilot in the cockpit of the aircraft and, on the other hand, the position on said aircraft of said detector intended to measure said lateral alignment beam; and B1 represents an angle which is determined by a difference between the heading of the aircraft and the lateral deviation LOCDEV.

2. The method as claimed in claim 1, wherein said elevation value Vsite is determined using the following expression:

$$Vsite=\text{arc } tg(H/DLOC),$$

in which:

arctg represents the inverse of the tangent;

H is a predetermined height between the ground and eyes of the pilot of the aircraft in the cockpit; and DLOC is said first distance.

3. The method as claimed in claim 2, wherein, during a takeoff phase, said first distance DLOC is calculated using the following expression:

$$DLOC=B2+RWYL-TS1-D1(t),$$

in which:

B2 represents the distance between the downstream end of the runway and the position of said radio transmitter transmitting said lateral alignment beam;

RWYL represents a length of the runway;

TS1 represents the distance between an upstream end of the runway and a predetermined position; and D1(t) corresponds to an integral with respect to time of a ground speed of the aircraft, between a time when the pilot opens throttles during a takeoff phase and a current time.

4. The method as claimed in claim 2, wherein, during a landing phase, said first distance DLOC is calculated using the following expression:

$$DLOC=B2+RWYL-TS2-D2(t),$$

in which:

B2 represents the distance between the downstream end of the runway and the position of said radio transmitter transmitting said lateral alignment beam;

RWYL represents the length of the runway;

TS2 represents the distance between the upstream end of the runway and a predetermined position; and D2(t) corresponds to the integral with respect to time of the ground speed of the aircraft between a time when the aircraft passes a threshold of the runway and the current time.

5. The method as claimed in claim 2, wherein said first distance DLOC is calculated during a takeoff phase using latitudes and longitudes of the aircraft and of the radio transmitter.

6. The method as claimed in claim 2, wherein said first distance DLOC is calculated during a landing phase using the latitudes and longitudes of the aircraft and of the radio transmitter.

7. The method as claimed in claim 1, wherein there is determined and displayed on said display screen in a form of a characteristic sign an assistance point which is such that said line passes through this characteristic sign on said display screen when the aircraft is aligned on the centerline of the runway.

8. An aircraft, wherein it comprises a system which is able to implement the method as claimed in claim 1.

9. A system for assisting lateral control of an aircraft running on a runway, said system comprising:

a detector for measuring a lateral deviation of the aircraft with respect to a lateral alignment beam, which is transmitted by a radio transmitter installed on ground downstream of a downstream end of said runway, said lateral deviation representing an angular deviation defined in a horizontal plane between, on the one hand, a straight line passing through said radio transmitter and said detector and, on the other hand, a centerline of said runway;

a calculator that calculates a first distance which is defined in the horizontal plane, along said runway, between a position of the pilot in a cockpit of the aircraft and said radio transmitter;

a central unit for determining, at least from said measured lateral deviation and said first calculated distance, a line intended to correspond with the centerline of the runway; and a head up display device for displaying that line on a display screen, superimposed on an environment existing in front of the aircraft, this line being displayed according to a true representation in such a way as to be shown superimposed on said centerline of the runway, wherein:

said central unit determines a first point and a second point, said first point corresponding to a position of said radio transmitter, seen by the pilot of the aircraft and being positioned horizontally according to a lateral deviation value and vertically according to an elevation value, said second point illustrating an orientation on the ground of said lateral alignment beam and being placed on a horizon line provided with a heading scale relative to a heading of the aircraft, said display device displays said line on said display screen in such a way as to pass through said first and second points, said lateral deviation value, which is expressed in an equation below as DEVL, is determined using said measured lateral deviation, which is expressed in equations below as LOCDEV, and said calculated first distance, which is expressed in an equation below as DLOC, and said lateral deviation value, DEVL, is determined using following expressions:

$$DEVL=LOCDEVc+A1, \text{ and}$$

$$LOCDEVc=\text{arc } tg[tg(LOCDEV)+(\Delta X.\sin B1+\Delta Y.\cos B1)/DLOC],$$

in which, in addition:

A1 represents an angular deviation in a horizontal plane between the heading of the aircraft and the orientation of said lateral alignment beam;

arctg represents an inverse of a tangent tg;

ΔY and ΔX illustrate predetermined longitudinal and lateral distances respectively between, on the one hand, the position of the pilot in the cockpit of the aircraft and, on the other hand, the position on said aircraft of said detector intended to measure said lateral alignment beam; and B1 represents an angle which is determined by a difference between the heading of the aircraft and the lateral deviation LOCDEV.

10. An aircraft, comprising a system as claimed in claim 9.

* * * * *